US012447413B2

(12) United States Patent
Cragg

(10) Patent No.: US 12,447,413 B2
(45) Date of Patent: Oct. 21, 2025

(54) SOLAR POWERED MOBILE FURNITURE

(71) Applicant: Brandon Cragg, Lauderdale by the Sea, FL (US)

(72) Inventor: Brandon Cragg, Lauderdale by the Sea, FL (US)

( * ) Notice: Subject to any disclaimer, the term of this patent is extended or adjusted under 35 U.S.C. 154(b) by 384 days.

(21) Appl. No.: 18/111,586

(22) Filed: Feb. 19, 2023

(65) Prior Publication Data

US 2023/0201727 A1 Jun. 29, 2023

Related U.S. Application Data

(63) Continuation-in-part of application No. 17/977,478, filed on Oct. 31, 2022, now abandoned, which is a continuation of application No. 17/243,062, filed on Apr. 28, 2021, now Pat. No. 11,484,803, which is a continuation-in-part of application No. 17/006,699, filed on Aug. 28, 2020, now abandoned, which is a continuation of application No. 16/114,951, filed on Aug. 28, 2018, now Pat. No. 10,758,829.

(60) Provisional application No. 62/551,009, filed on Aug. 28, 2017.

(51) Int. Cl.
*A63F 13/90* (2014.01)
*A63F 13/98* (2014.01)
*A45C 11/00* (2006.01)

(52) U.S. Cl.
CPC .............. *A63F 13/90* (2014.09); *A63F 13/98* (2014.09); *A45C 11/003* (2025.01)

(58) Field of Classification Search
CPC ......... A63F 13/90; A63F 13/98; A45C 11/003
See application file for complete search history.

(56) References Cited

U.S. PATENT DOCUMENTS

2011/0092294 A1* 4/2011 Mercier .................. A63F 13/90 463/46
2019/0057641 A1* 2/2019 Winston .............. G07F 17/3251

FOREIGN PATENT DOCUMENTS

DE 102006023899 A1 * 11/2007 ............. A45C 13/02
JP 2001186935 A * 7/2001
WO WO-2018205116 A1 * 11/2018

* cited by examiner

*Primary Examiner* — Jasson H Yoo
(74) *Attorney, Agent, or Firm* — Malloy & Malloy, P.L.; Robert M. Downey

(57) ABSTRACT

Solar powered mobile furniture components each include a collapsible cabinet on wheels that supports at least one larger size flat screen TV monitor, speakers, solar panels, a rechargeable DC power source, and an inverter for converting DC power input to AC power output. In a preferred embodiment, the solar powered mobile furniture components include a bar, a credenza and a TV stand that have various devices and accessories such as a cooler, refrigerator, fans, propane tank and cooktop, computer hard drives and USB charging ports. The solar powered bar and solar powered credenza include removable door panels having collapsible, folding legs to convert the doors into tables or bar counters when the doors are removed from a main cabinet structure.

7 Claims, 14 Drawing Sheets

SOLAR POWERED MOBILE FURNITURE

This non-provisional patent application is a Continuation-In-Part of non-provisional patent application Ser. No. 17/977,478 filed Oct. 31, 2022, which is a Continuation of non-provisional patent application Ser. No. 17/243,062 filed Apr. 28, 2021, now U.S. Pat. No. 11,484,803 issued Nov. 1, 2022, which is a Continuation-In-Part of non-provisional patent application Ser. No. 17/006,699 filed Aug. 28, 2020, which is a Continuation of non-provisional patent application Ser. No. 16/114,951 filed Aug. 28, 2018, now U.S. Pat. No. 10,758,829 issued Sep. 1, 2020, which is based on provisional patent application Ser. No. 62/551,009 filed Aug. 28, 2017.

BACKGROUND OF THE INVENTION

Field of the Invention

The present invention relates to collapsible and mobile furniture and, more particularly, to mobile furniture items that each include at least one full size flat screen television monitor, speakers, solar panels, a refrigerator and a rechargeable DC power source all carried in a protected cabinet supported on wheels, and wherein the protective cabinets convert into a bar, a credenza, a TV stand and other furniture items.

Discussion of the Related Art

The operation of a full sized TV monitor, such as a LCD flat screen TV of 20 inches or larger in size, typically requires connection to an AC power source. Moreover, other components that may be used in conjunction with the TV monitor, such as a video game console, added speakers, and other electronic devices typically require connection to an AC power source as well. However, there are instances where it is desirous to be able to use a larger flat screen TV monitor at locations where there is no access to an AC power source. For example, beaches, parks, campgrounds and other outdoor venues typically do not have convenient access to an AC power source where one or more flat screen television monitors, speakers, a refrigerator and other appliances and components can be plugged in for supplying power to operate these electric appliances. Moreover, it can be difficult to transport a larger size flat screen TV monitor along with speakers, a refrigerator and other electronic components to an outdoor venue, such as a beach or park, or even a home patio or driveway.

Accordingly, there remains a need for mobile furniture items, such as a bar, a credenza and a TV stand, that each include at least one larger size (i.e., 20 inches or greater in size) flat screen TV monitor, one or more speakers, a refrigerator, solar panels, and a rechargeable DC power source.

SUMMARY OF THE INVENTION

The present invention is directed to solar powered mobile furniture items that each include a collapsible cabinet on wheels and supporting at least one larger size flat screen TV monitor, speakers, solar panels, a rechargeable DC power source, and an inverter for converting DC power input to AC power output. In a preferred embodiment, the solar powered mobile furniture items include a bar, a credenza and a TV stand. The solar powered bar and solar powered credenza include removable door panels having collapsible, folding legs to convert the doors into tables or bar counters when the doors are removed from a main cabinet structure. The bar, credenza and TV stand are all supported on wheels for ease of transport. The solar powered bar, solar powered credenza and solar powered TV stand components also include various devices and accessories such as a cooler, refrigerator, fans, propane tank and cooktop, computer hard drives and USB charging ports. The solar powered mobile furniture items are functional as emergency furniture, particularly during extended power outages, such as after a major hurricane.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
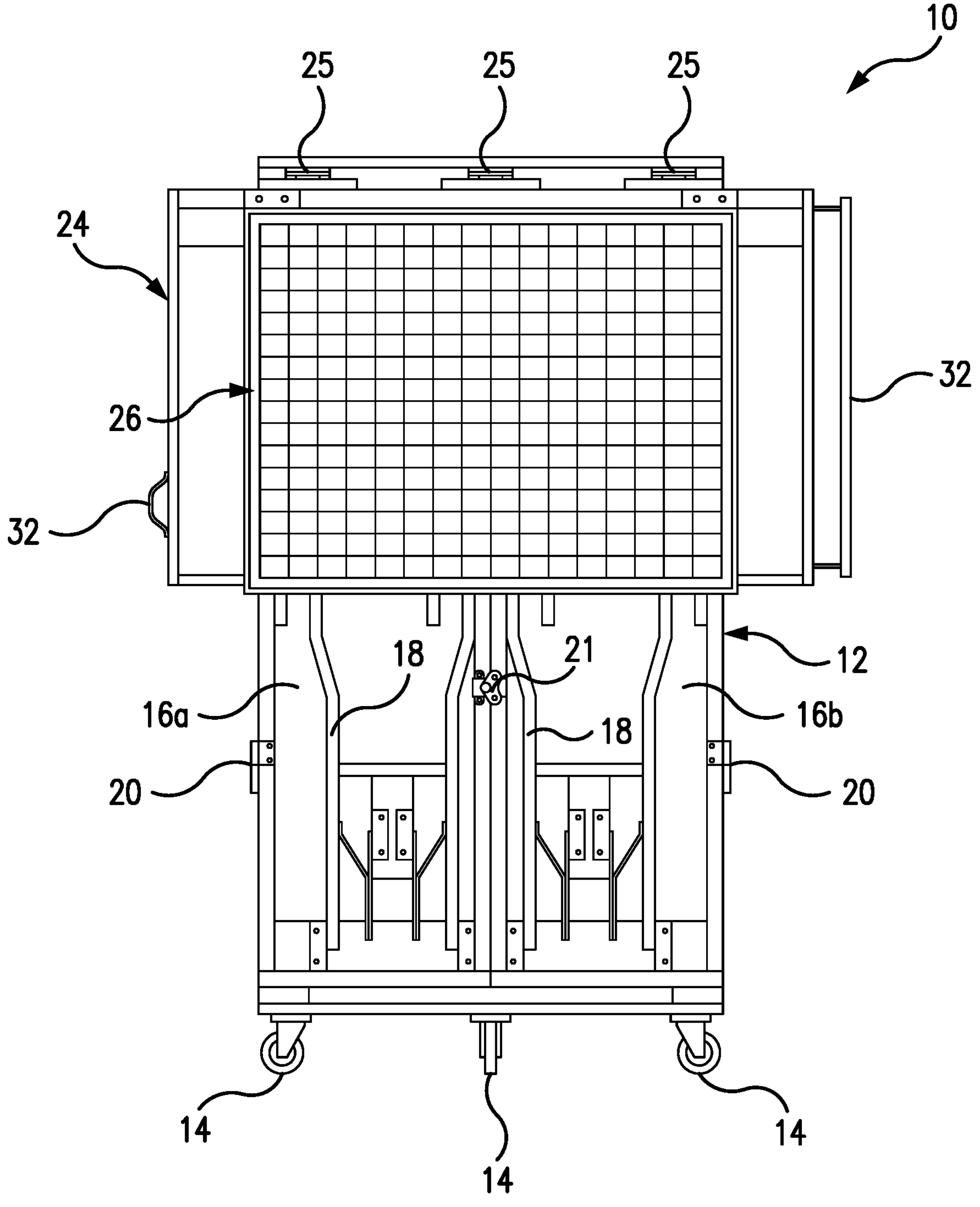
FIG. 1 is a front elevational view showing a first component of the solar powered mobile furniture of the present invention, wherein the first component is a solar powered bar shown in a collapsed state for transport and storage.
Figure 2:
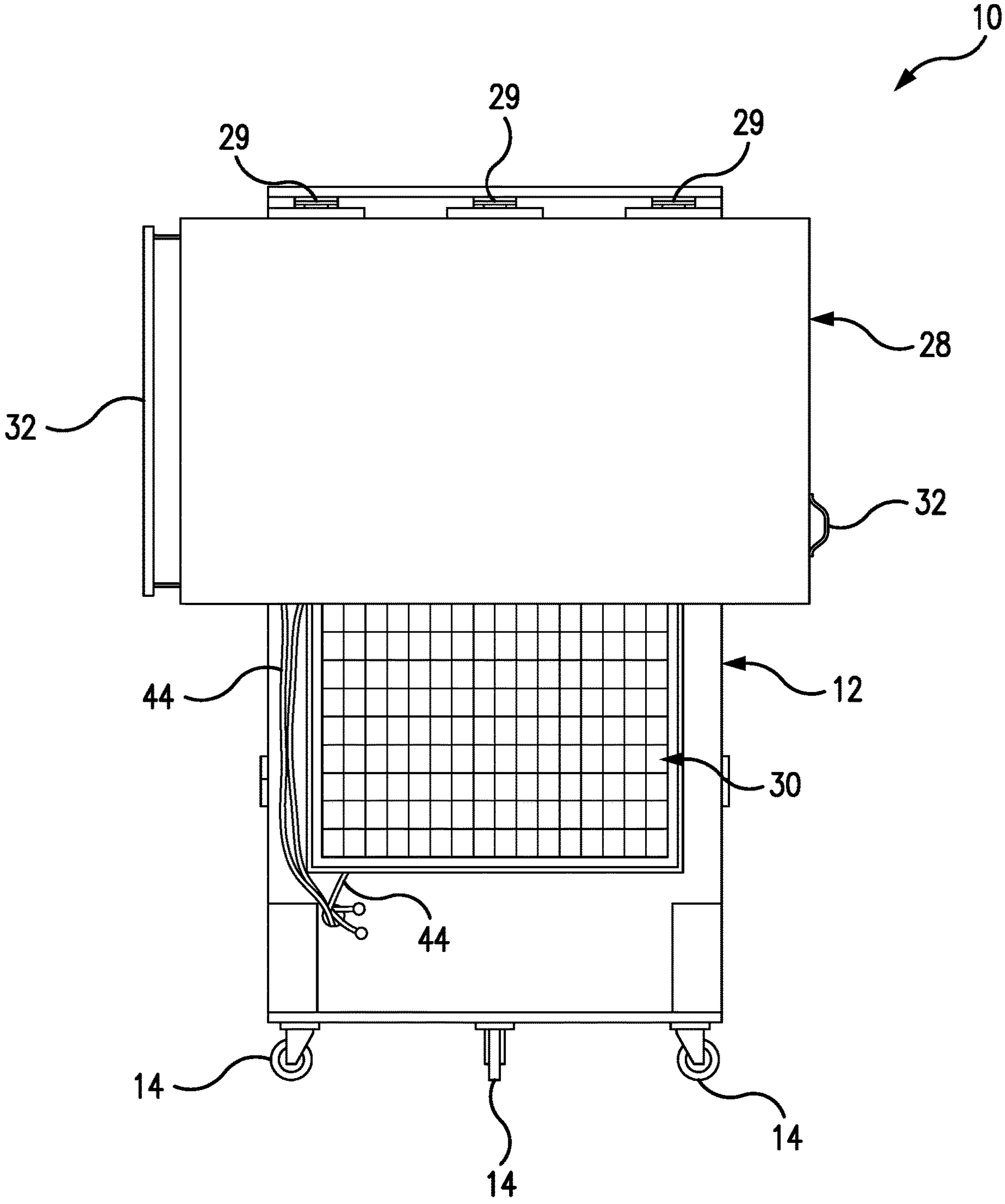
FIG. 2 is a rear elevational view of the solar powered bar component shown in the collapsed state for transport and storage.
Figure 3:
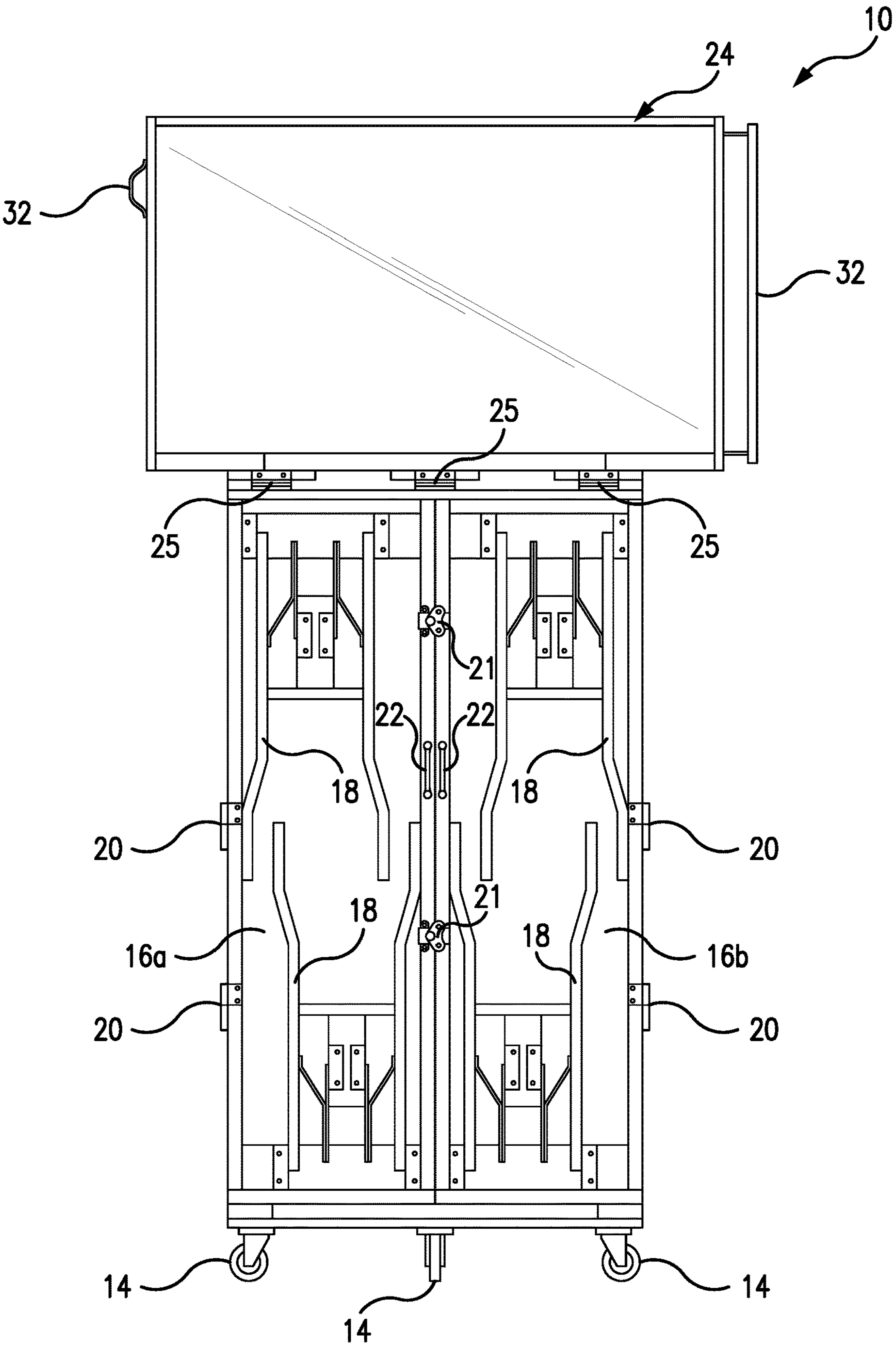
FIG. 3 is a front elevational view of the solar powered bar component shown with a front flat screen TV monitor moved to a raised, viewable position.
Figure 4:
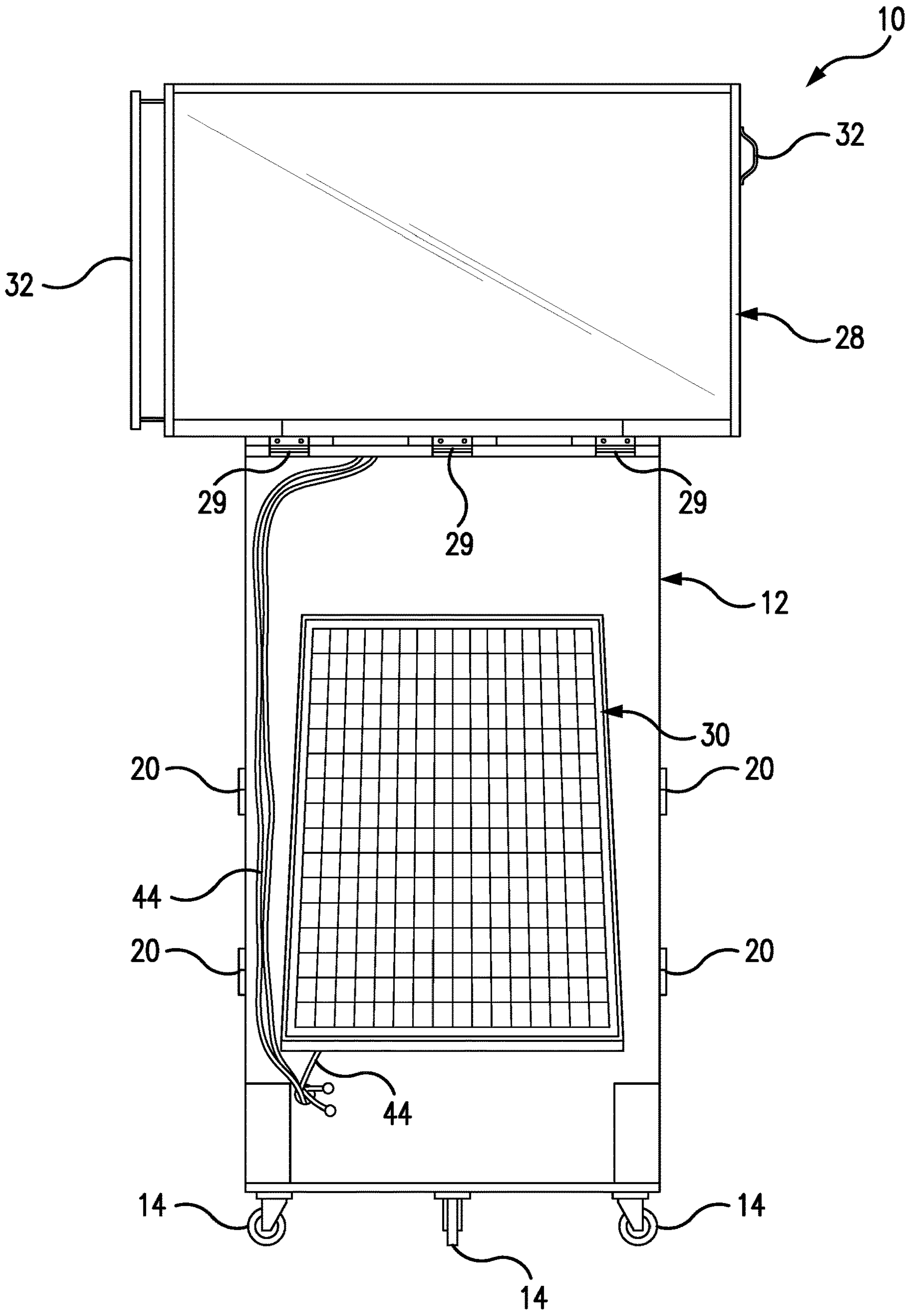
FIG. 4 is a rear elevational view of the solar powered bar component shown with a second, rear flat screen TV monitor in a raised position for viewing.
Figure 5:
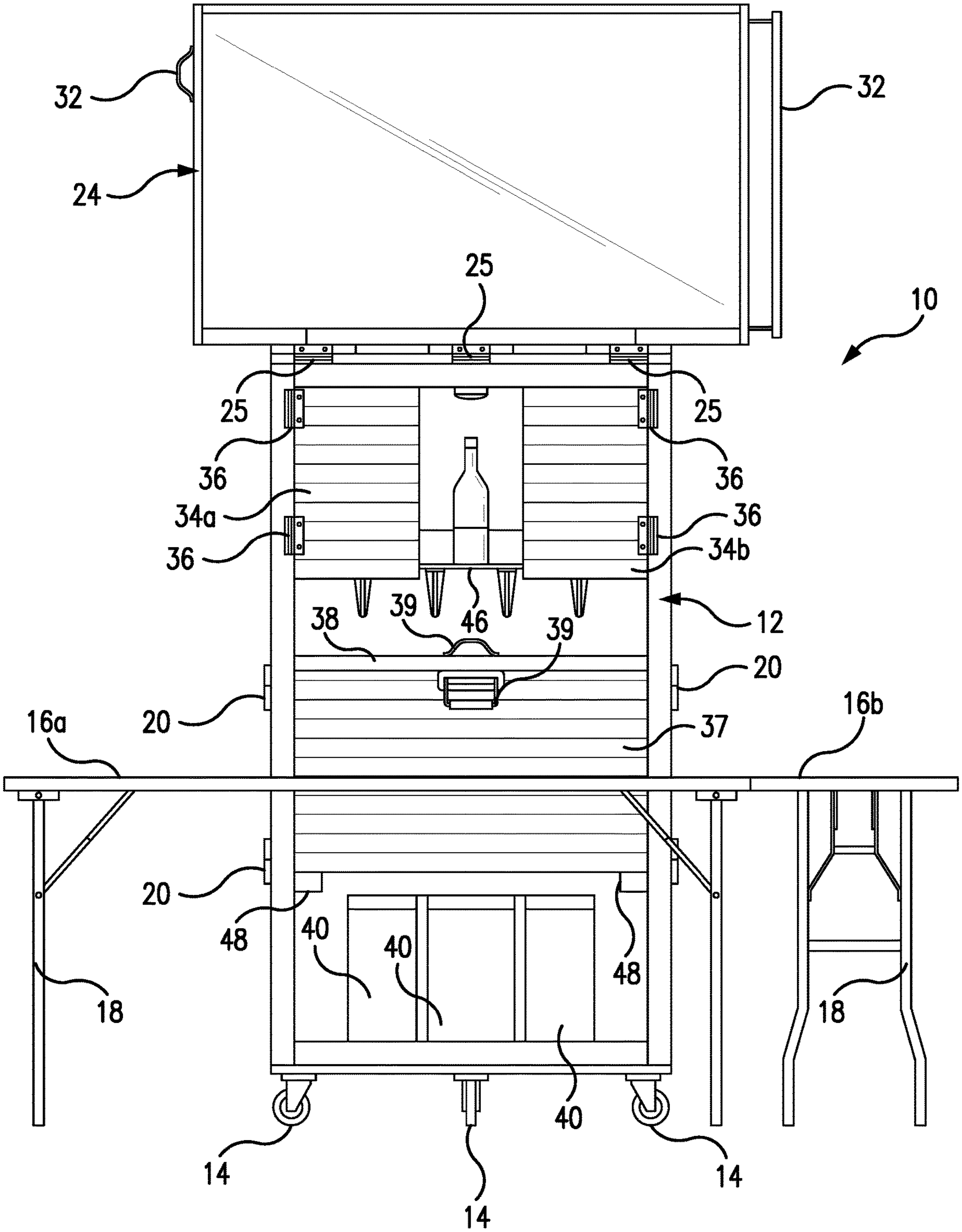
FIG. 5 is a front elevational view of the solar powered bar component shown with front door panels removed from a main cabinet structure and with foldable legs extended to provide bar counters, and revealing an interior of the solar powered bar including a cooler, rechargeable battery power source, speaker boxes and a bar shelf with alcohol.

Referring to the several views of the drawings, various components of the solar powered mobile furniture apparatus are shown according to the present invention. The various components of the solar powered mobile furniture apparatus may also be considered as emergency furniture components for use during power outages, and particularly extended power outages that might be experienced after a storm, natural disaster or act of war. As shown in FIGS. 1-6, one component of the mobile furniture apparatus includes a solar powered bar 10 having a main vertical cabinet 12 that is supported on two or more wheels 14 to allow ease of transport of the solar powered bar 10 along a floor or ground surface. The vertical cabinet 12 includes left and right front doors **16*a* and 16*b* that swing open and closed on barrel hinges 20. The barrel hinges 20 allow the doors 16*a* and 16*b* to be easily removed by simply lifting the doors off of the barrel hinges. Once removed, the doors 16*a*, 16*b* can be set up to create bar counters. Specifically, collapsible legs 18 on the doors fold out to support the doors horizontally above the floor. The solar bar 10 further includes multiple flat screen TV monitors 24 and 28 that fold down on hinges during transport and storage of the solar bar 10. The large flat screen TV monitors 24 and 28 are provided with handles 32 to facilitate ease of movement between the raised position and lowered position, as shown in FIGS. 1-6**.

The solar bar 10 further includes at least two solar panels 26 and 30 for recharging one or more DC battery power sources in the vertical cabinet 12. In one embodiment, the solar panels 26, 30 have a 12 volt, 60 watt rating. It is important to note that the DC battery power sources can also be charged by plugging into a standard electrical outlet, such as a 110 volt outlet.

Figure 6:
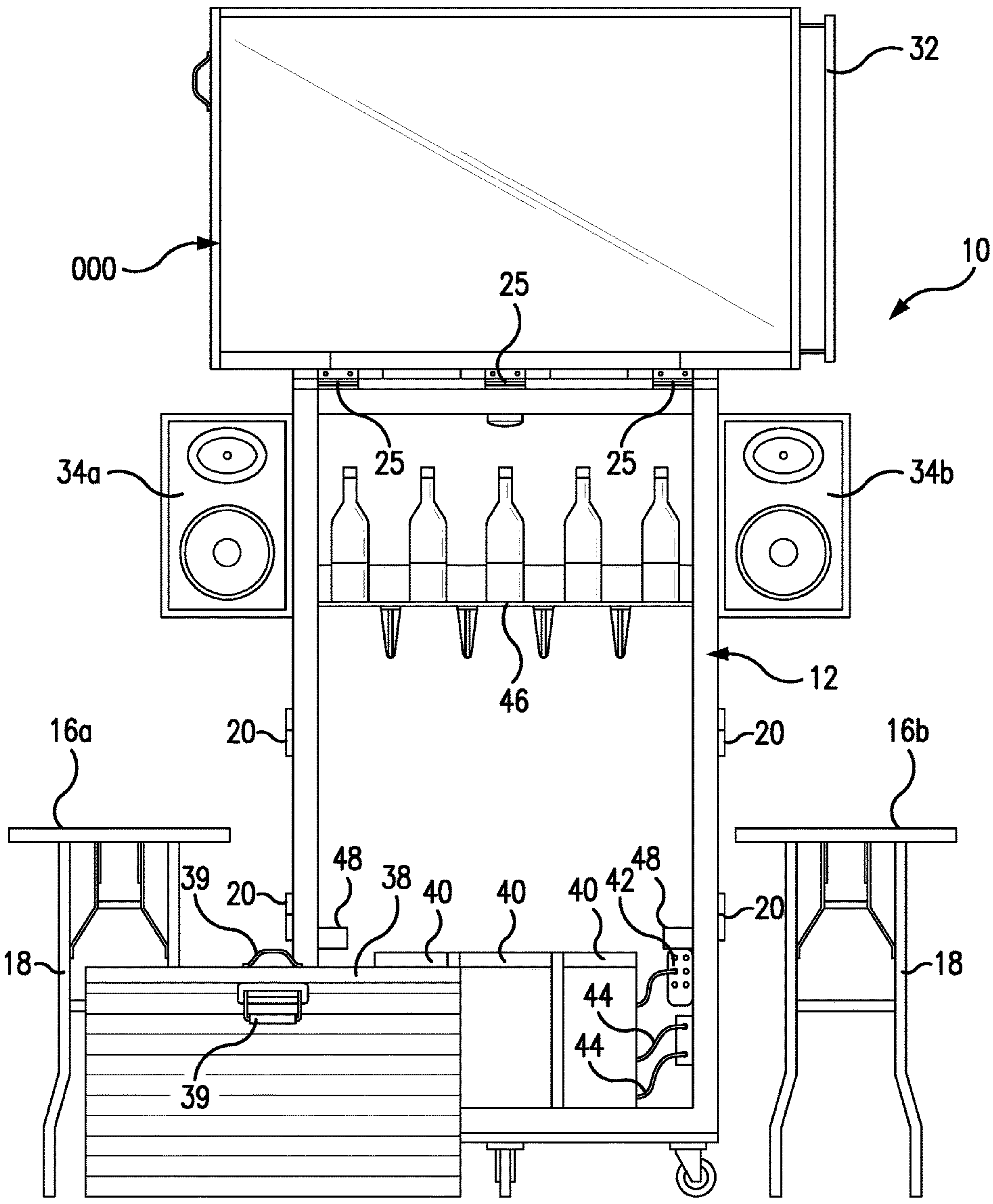
FIG. 6 is a front elevational view of the solar powered bar component shown in a fully opened and operable state with the door panels removed and set up as bar counters, the cooler removed, speakers hinged open and the large flat screen TV monitor hinged up to the viewable position and the bar interior fully revealed including a bar shelf with various alcohol beverages.

The solar bar 10 further includes audio speakers **34*a*, 34*b* that are preferably supported within boxes that are hinged to the cabinet 12 on hinges 36. The hinges 36 allow the speaker boxes to swing out to an open position, as seen in FIG. 6, to expose the audio speakers 34*a*, 34*b* and project sound towards the front of the bar. A cooler 37 supported within the cabinet on a ledge 48 is removable, as seen in FIG. 6. The cooler is used to store beverages, such as cold beer, along with ice. The cooler includes a lid 38, handles 39 on the side for carrying the cooler and a top handle 39 to remove the lid 38**.

The solar panels 26 and 30 are used for recharging a rechargeable battery source 40, which may be a series of lithium ion batteries. An inverter 42 converts the DC power from the batteries 40 to AC power for powering the several electronic components including the large TV monitors 24, 28, the speakers **34*a*, 34*b*, and other electrically powered components that may be provided within the solar bar. Wire conductors 44 extend between the solar panels and the batteries for recharging the batteries 40. A bar shelf 46** supports an arrangement of beverages, such as beer, wine, and spirits (liquor).

Figure 7:
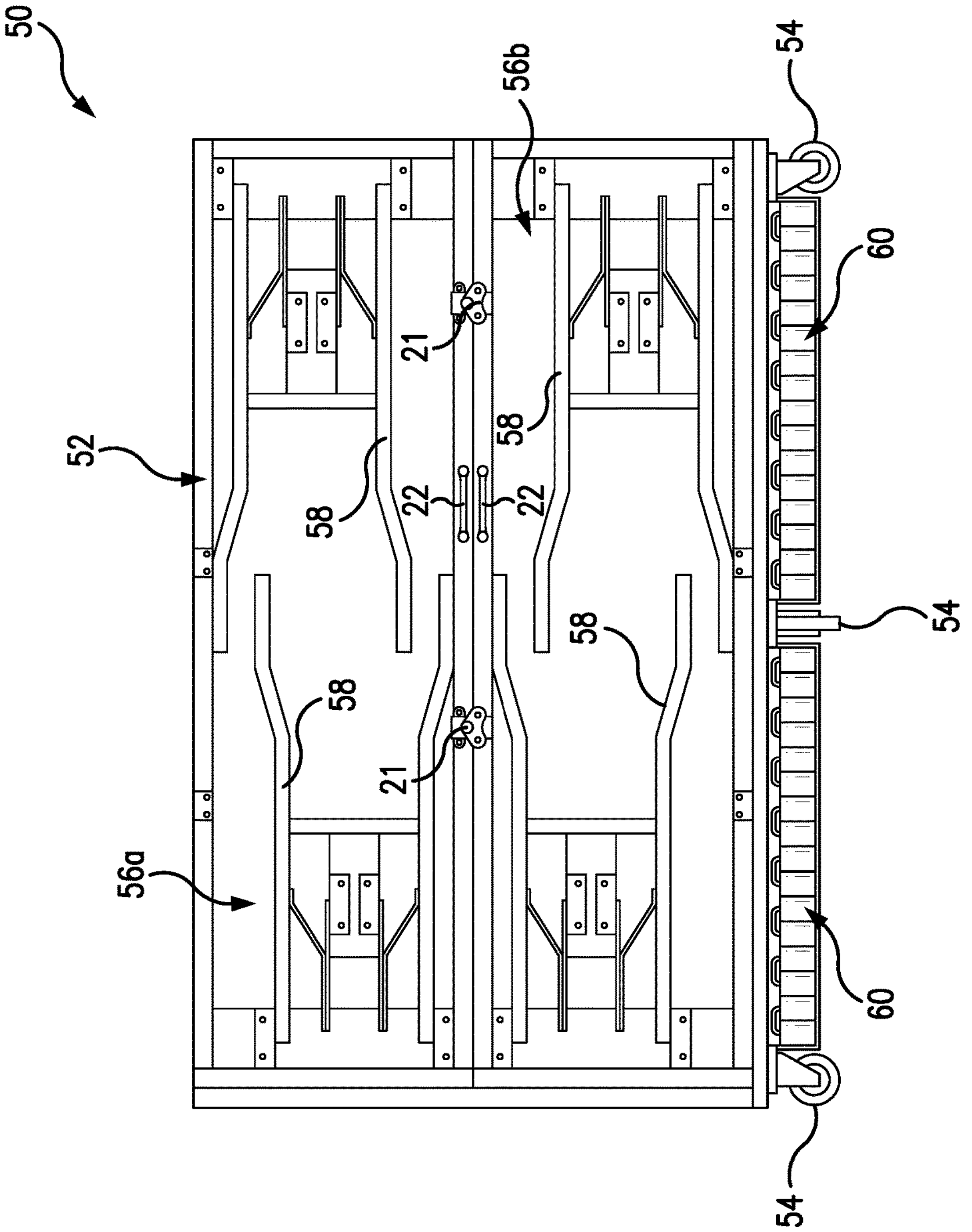
FIG. 7 is a front elevational view illustrating a second component of the solar powered portable furniture of the present invention in the form of a credenza and shown in a collapsed, packaged state for ease of transport and storage.
Figure 8:
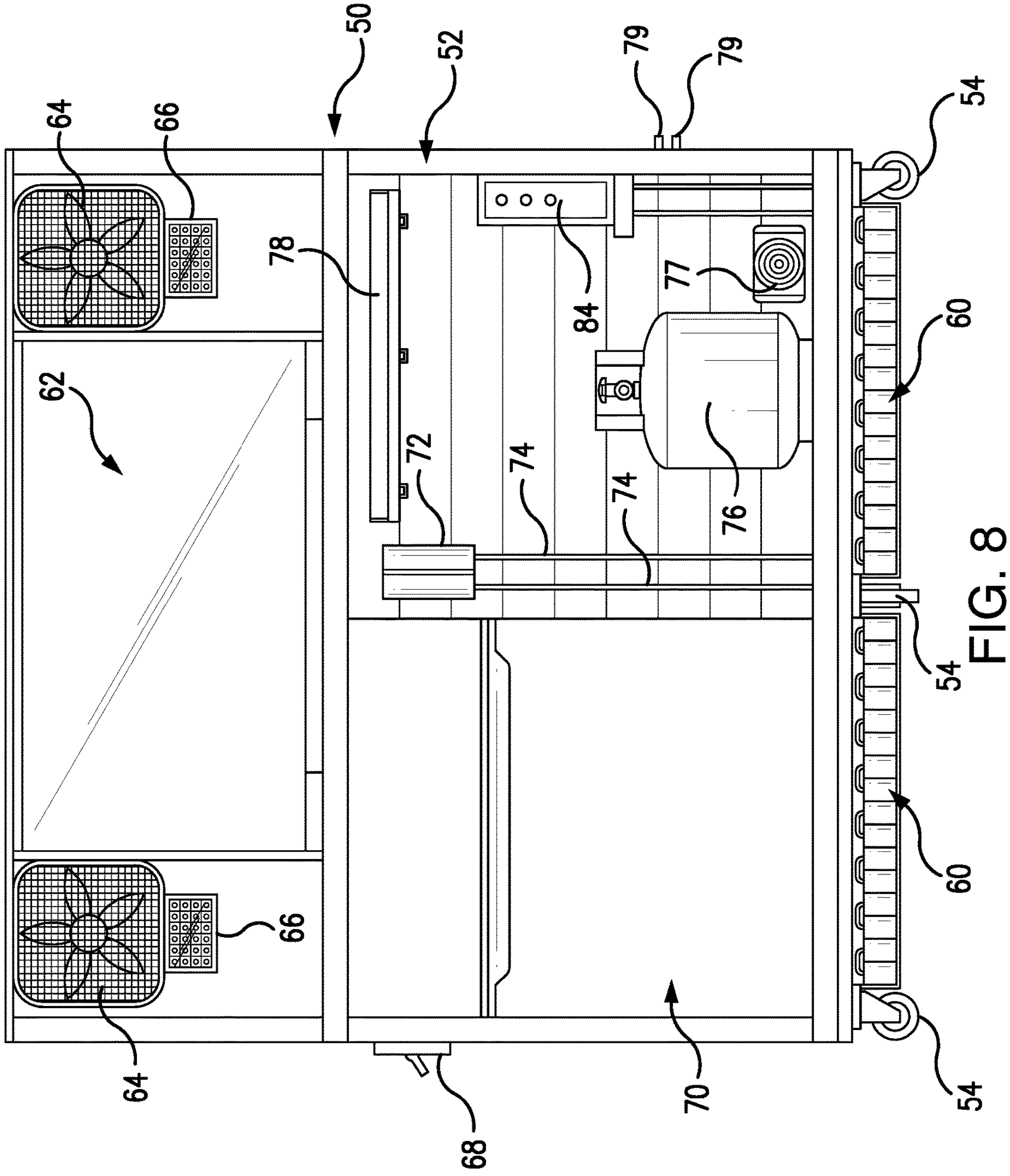
FIG. 8 is a front elevational view of the credenza component shown with front door panels removed to reveal an interior of the credenza including a refrigerator, propane tank and cooktop, inverter, propane recharge motor, hard drive and rechargeable batteries, and further showing a large flat screen TV monitor hinged up to a raised, viewable position and solar powered fans on opposite sides.
Figure 9:
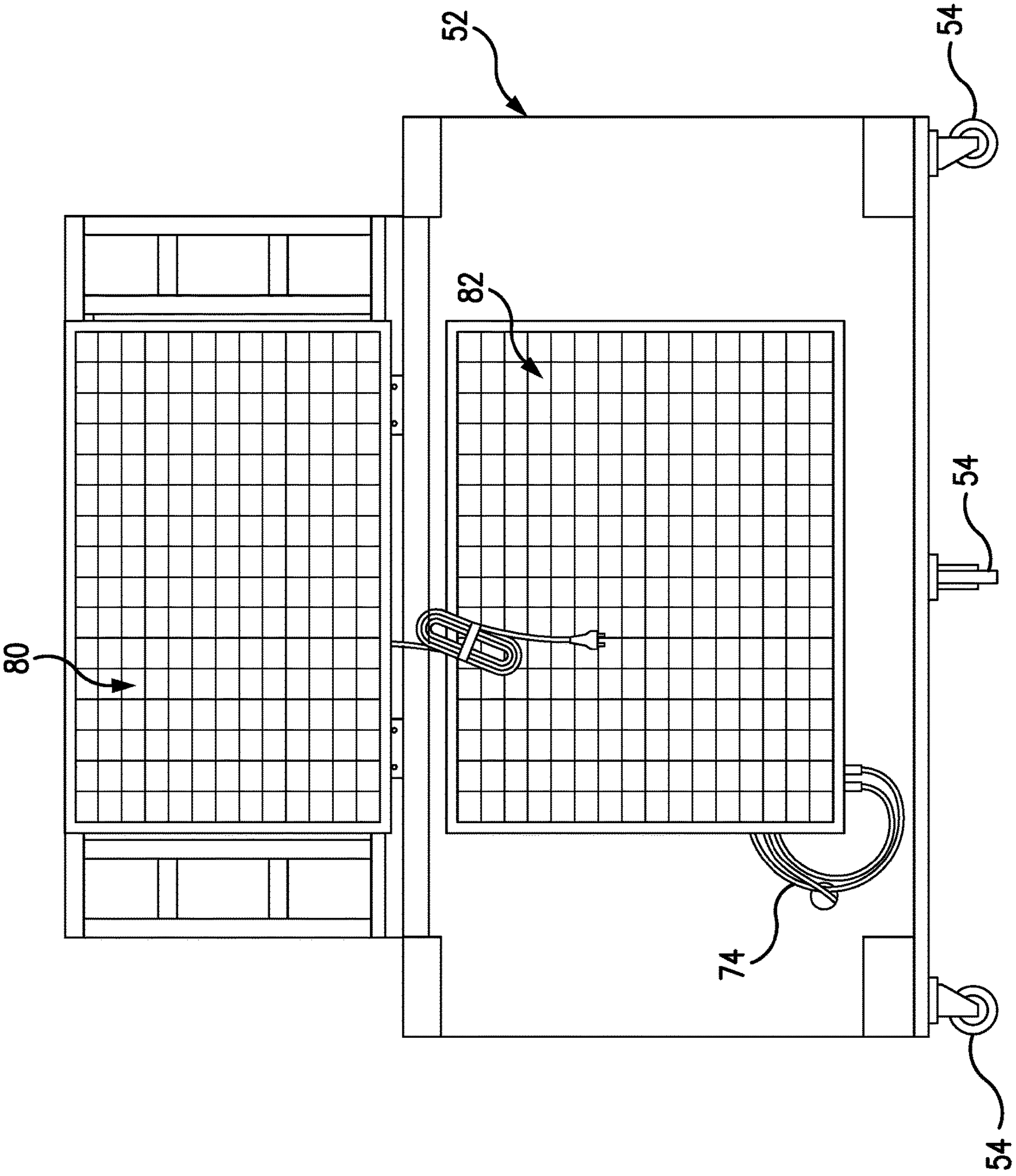
FIG. 9 is a rear elevational view of the credenza component showing first and second solar panels on the back of the credenza.

Referring to FIGS. 7-9, a second component of the mobile furniture apparatus includes a solar powered credenza 50. Much like the solar powered bar component 10, the credenza component 50 includes a cabinet 52 that is supported on wheels 54 to allow ease of transport of the solar powered credenza 50 along a floor or ground surface. The cabinet 52 is arranged generally in a horizontal fashion, with top and bottom front doors **56*a* and 56*b* that remove from the front of the cabinet to reveal the inner components and accessories, as shown in FIG. 8. Much like the left and right front doors 16*a* and 16*b* of the solar powered bar 10, the upper and lower doors 56*a*, 56*b* are secured with the use of latches 21 that connect the upper and lower doors together and help to maintain them in locked, covering position on the front of the cabinet 52. Handles 22 are provided on the doors to allow for removal of the doors 56*a*, 56*b* from the cabinet 52. Once removed, the doors 56*a*, 56*b* can be set up as tables. Specifically, collapsible and foldable legs 58 are extended out and locking into a lowered, operable position to support the doors 56*a*, 56*b* as tables, similar to as shown in connection with the solar powered bar component 10 in FIGS. 5 and 6. With the doors 56*a*, 56*b* removed from the cabinet 52, the several elements and accessories are shown in FIG. 8. In particular, the credenza component includes rechargeable batteries 60 supported along a bottom of the cabinet 52. The rechargeable batteries may be a series of lithium ion batteries. The credenza component 50 further includes a large smart TV 62 that is hinged to the top of the cabinet 52, allowing the smart TV 62 to swing up above the cabinet 52 to assume an upright, operable and viewable position, as seen in FIG. 8. A panel that supports the large smart TV 62 also supports fans 64 and removable LED lights 66. An AC/DC switch 68 is provided on a side of the cabinet 52. A refrigerator 70 is supported within the credenza component, along with an inverter 72, a propane tank 76 and a gas flat cooktop 78 that slides in and out of the cabinet 52. The propane tank 76 provides gas to the flat cooktop for heating the cooktop to a desired temperature for cooking thereon. A propane recharge motor 77 is supported within a lower portion of the cabinet 52. Wire conductors 74 extend from the inverter 72 and connect to both the battery source 60 and smart TV 62. The inverter 72 converts DC electric power from the battery 60 to AC electric power for powering the smart TV 62. External posts 79 are provided on the side of the cabinet 52 for connecting electrically powered components. An external hard drive 84 is also supported within the cabinet 52 and is connected to the large smart TV 62 for providing video and audio content that is stored on the external hard drive 84. Referring to FIG. 9, a first solar panel 80 is supported on the TV panel, behind the TV, which hinges up and down relative to the cabinet 52. A second solar panel 82 is mounted to the back side of the cabinet 52. The solar panels 80 and 82 are electrically connected to the batteries 60** to recharge the batteries during sunlight hours.

Figure 10:
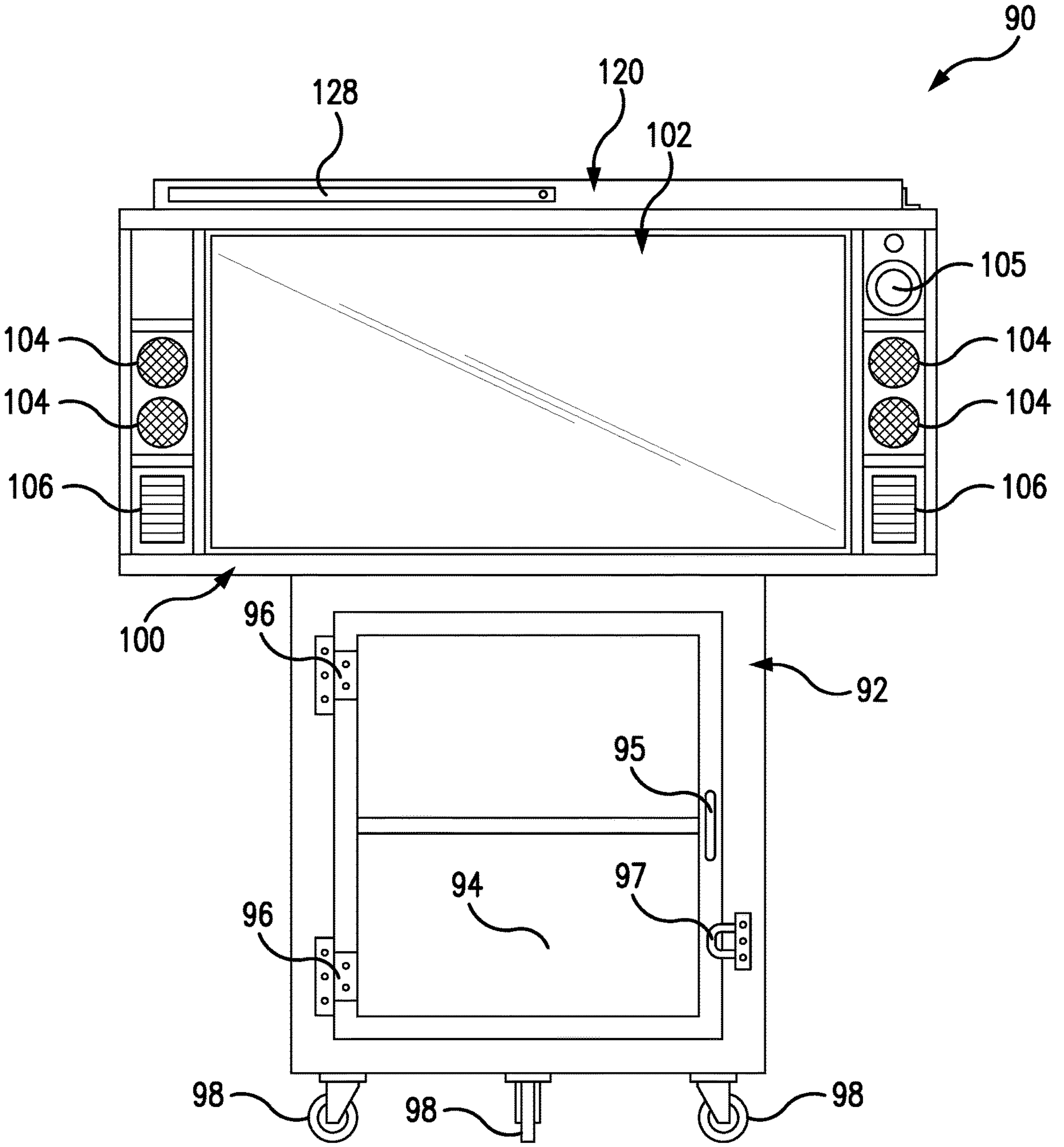
FIG. 10 is a front elevational view of a TV stand component of the solar powered portable furniture of the present invention.
Figure 11:
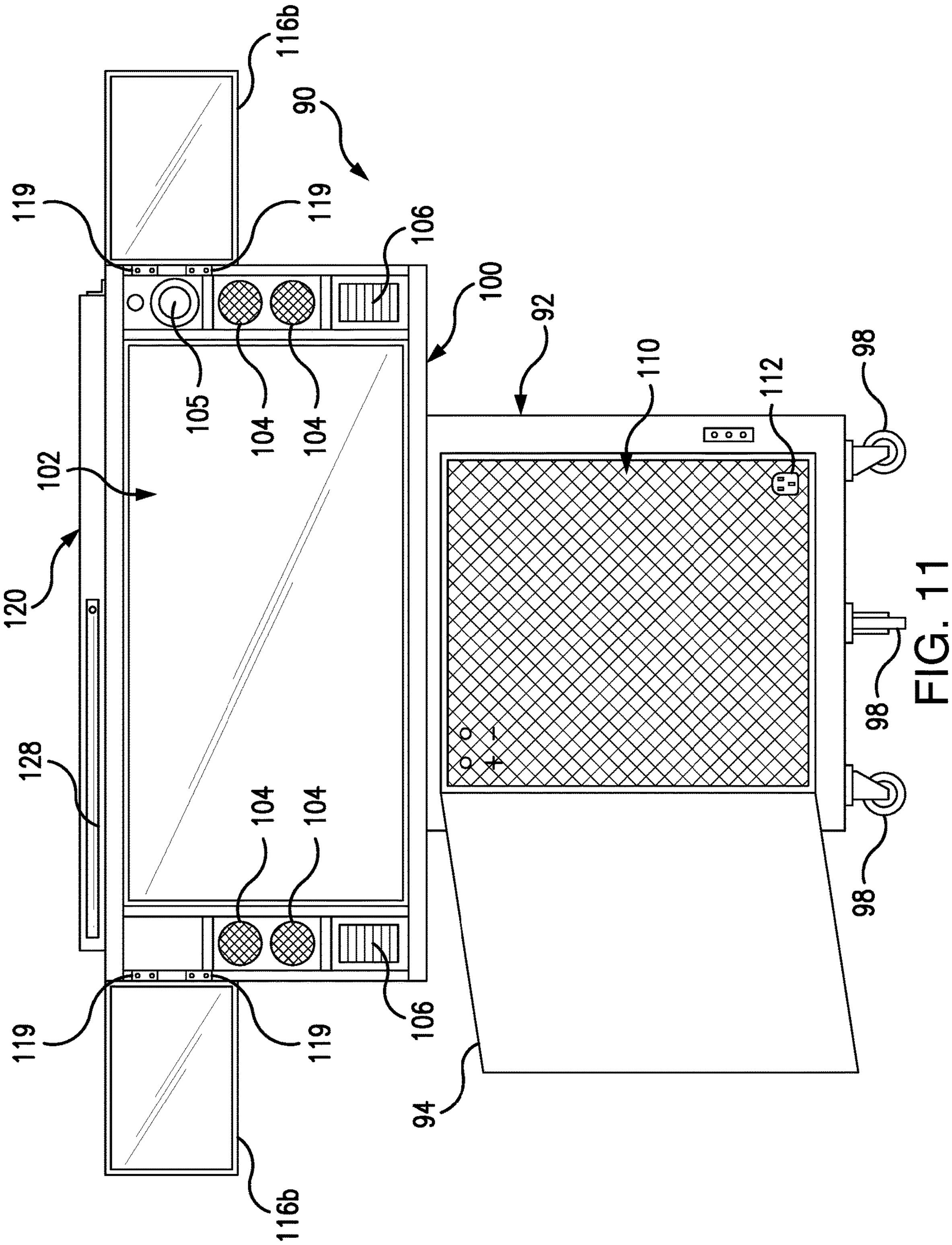
FIG. 11 is a front elevational view of the TV stand component in a fully opened and operational mode including a large flat screen TV monitor, smaller TV monitors hinged outwardly to a viewable position, a rechargeable battery, speakers, a subwoofer and a top solar panel.

Referring to FIGS. 10-13, a third component of the mobile furniture apparatus is shown and is directed to a portable solar powered TV stand 90. The portable solar powered TV stand 90 includes a base battery cabinet 92 having a front door 94 that is hinged at 96 to allow the door to swing open and closed. A handle 95 facilitates ease of opening and closing the door 94. A door lock 97 secures the door locked and closed, as seen in FIG. 10. The base battery cabinet 92 is supported on wheels 98 for ease of transport along a floor or ground surface. The portable solar powered TV stand 90 includes a large front TV 102 with speakers 104 and a subwoofer 105. The TV panel further includes external hard drives 106 for providing video and audio content to the TV 102. A rechargeable battery source 110 is supported in the base battery cabinet 92, as seen in FIG. 11. The battery source 110 includes a recharge port 112 for connection to an electric power supply source for recharging the battery source 110. The portable solar powered TV stand 90 further includes a large rear TV 114. The rear TV 114 is not fully illustrated, but is identical to the front TV 102 and includes the same components, namely speakers, a subwoofer and external hard drives.

Figure 12:
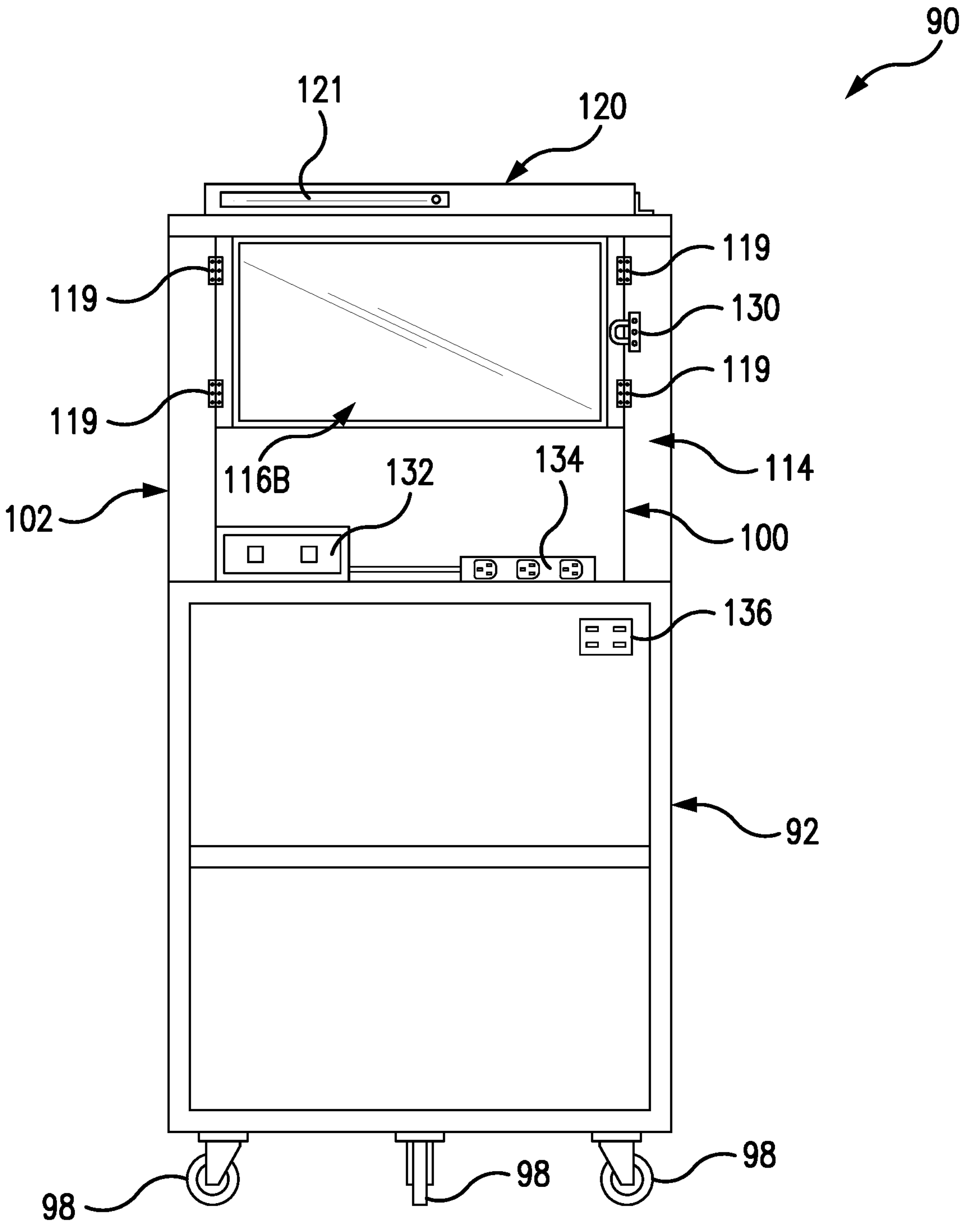
FIG. 12 is a side elevational view of the TV stand component shown in a collapsed, packed state for ease of transport and storage.
Figure 13:
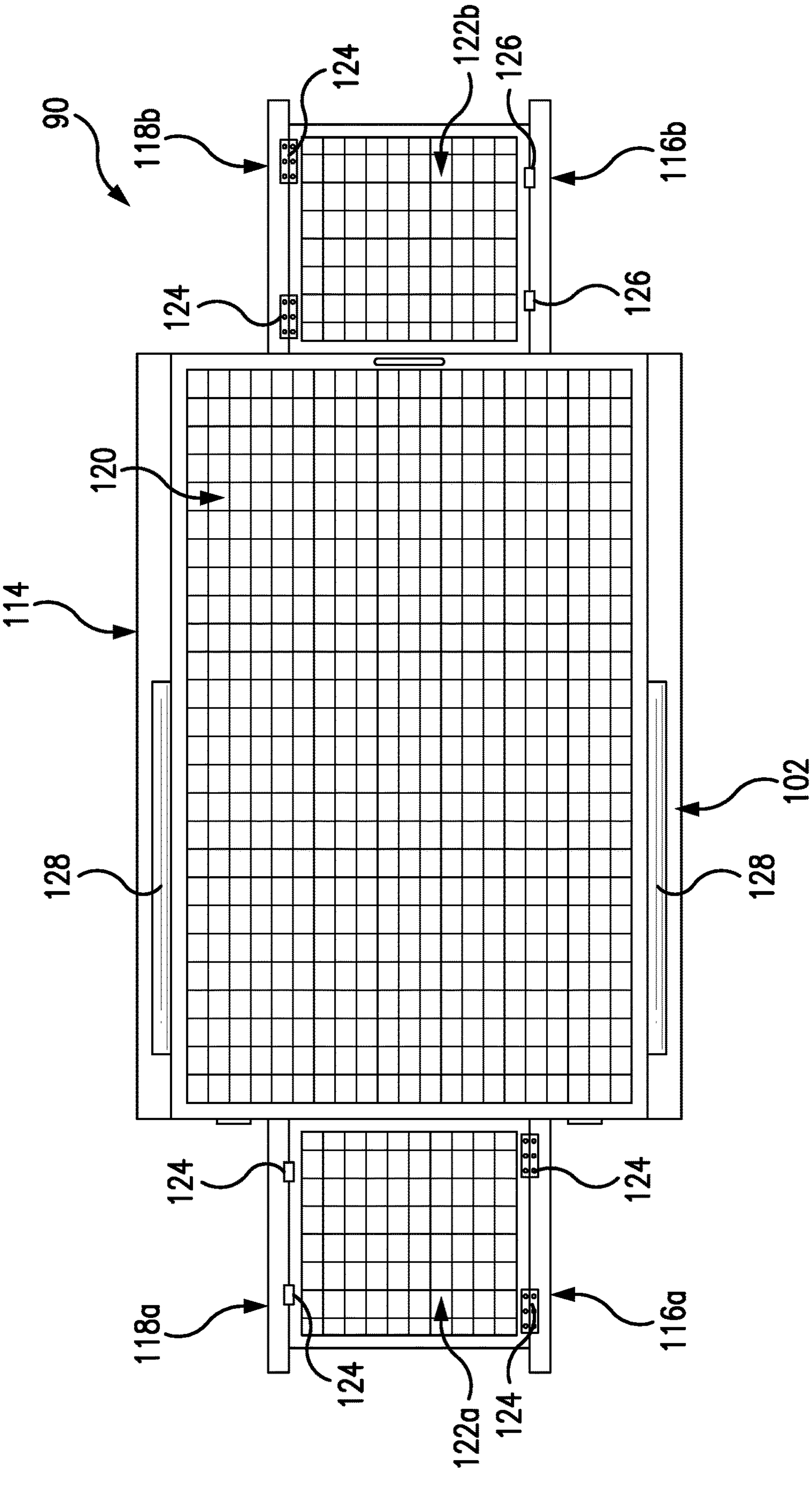
FIG. 13 is a top plan view of the TV stand component in an expanded, open and operable state with a main solar panel and opposite side solar panels in a functional and operation position.

The portable solar powered TV stand further includes front side extending TVs 116*a*, 116*b* and rear side extending TVs 118*a* and 118*b*. The side extending TVs 116*a*, 116*b*, 118*a* and 118*b* are all supported on hinges 119 that allow the side extending TVs to be moved from a collapsed position on the side of the TV stand, as shown in FIG. 10, and fully extended, viewable positions, as seen in FIGS. 11 and 13. A top solar panel 120 is supported between the large front TV 102 and the large rear TV 114, as seen in FIG. 13. A handle 121 on the top solar panel allows for ease of movement of the top solar panel from the operable position to a collapsed position. Side solar panels 122*a* and 122*b* are hinged to one of the front or rear side extending TVs and are supported on hinges 124 to allow movement from a collapsed position to an extended position to support the side solar panels 122*a*, 122*b* between respective front and rear side TVs, as seen in FIG. 13. Support brackets 126 are provided to hold the side solar panels in the extended, operable position. The top solar panel includes support legs 128 for holding the top solar panel 120 in the operable position between the large front and rear TVs 102 and 114. When the side TV monitors are folded and collapsed behind one another, as seen in FIG. 12, a locking device 30 is used to secure the side TVs in the stowed position, collapsed against the side of the top TV cabinet 100. The portable solar powered TV stand further includes an inverter 132 for converting the DC battery power to AC electric power in order to properly power the several TVs and other components. As seen in FIG. 12, the side of the solar powered TV stand further includes a multiport plug 136 for connecting AC electric powered devices. Additionally, a multiport charger (USB) 136 is provided on the side of the solar powered TV stand.

Figure 14:
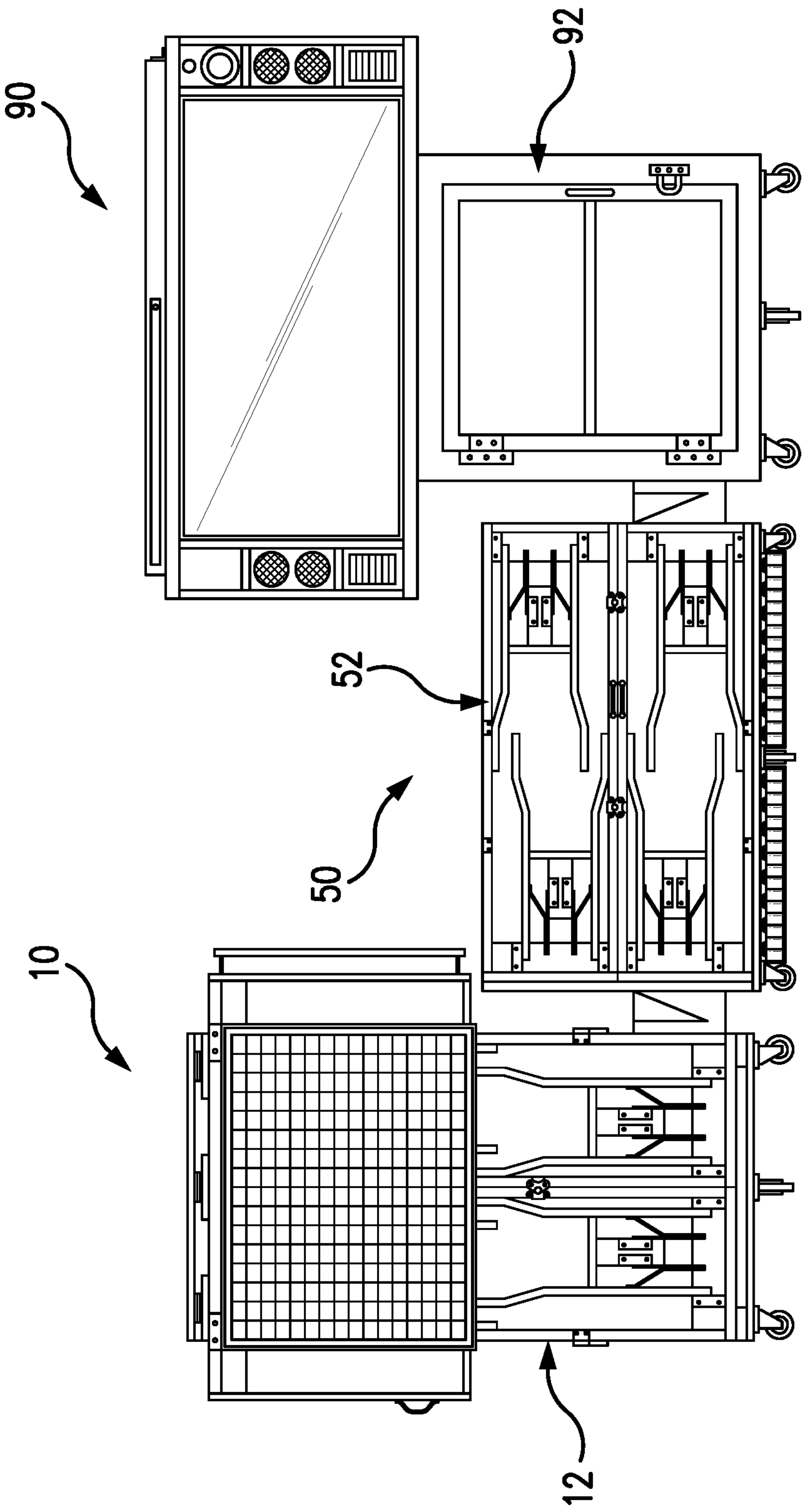
FIG. 14 is a front elevational view showing the three components of the solar powered portable furniture attached together, including the solar powered bar, the credenza and the TV stand, combined as one large unit.

Referring to FIG. 14, all of the components of the solar powered mobile furniture apparatus are shown connected together. Specifically, the solar powered bar 10, the solar powered credenza 50 and the solar powered TV stand 90 are all connected together as one unit. To connect the several furniture components together, a French cleat or other mechanism may be used that allows for easy connection and release of the furniture components 10, 50 and 90 from one another.

While the present invention has been shown and described in accordance with several preferred and practical embodiments, it is recognized that departures from the instant disclosure are fully contemplated within the spirit and scope of the present invention which is not to be limited except as defined in the following claims as interpreted under the Doctrine of Equivalents.

What is claimed is:

1. A mobile furniture apparatus comprising:

at least one cabinet including a front, a rear, opposite sides, a top and a bottom, and a plurality of wheels on the bottom for transport of the at least one cabinet on a ground surface;

at least one flat screen television (TV) monitor hingedly supported on the at least one cabinet and movable between a lowered, collapsed position and a raised, viewable position;

a plurality of speakers on the at least one cabinet;

at least one solar panel hingedly attached to the at least one cabinet and movable between a lowered, collapsed position and a raised, operable position;

a rechargeable direct current (DC) power source for powering the at least one flat screen TV monitor and the plurality of speakers;

an inverter for converting DC power input from the direct current (DC) power source to AC power output for electrically powering the at least one flat screen television (TV) monitor and the plurality of speakers;

the at least one cabinet includes at least one door that is removable from the cabinet, and wherein the at least one door includes collapsible and extendable legs for supporting the at least one door horizontally above a floor surface to provide a table, counter or bar top; and the at least one solar panel being electrically connected to the rechargeable direct current (DC) power source for recharging the direct current (DC) power source.

2. The mobile furniture apparatus as recited in claim 1 wherein the rechargeable direct current (DC) power source includes at least one lithium ion battery.

3. The mobile furniture apparatus as recited in claim 1 wherein the at least one cabinet is structured to transform into a bar.

4. The mobile furniture apparatus as recited in claim 1 wherein the at least one cabinet is structured to transform into a credenza.

5. The mobile furniture apparatus as recited in claim 1 wherein the at least one cabinet is structured to transform into a TV stand.

6. The mobile furniture apparatus as recited in claim 1 further comprising:

at least one computer hard drive supported on the at least one cabinet.

7. The mobile furniture apparatus as recited in claim 1 wherein the at least one cabinet includes a cooktop.

* * * * *